March 11, 1958 — H. OETIKER — 2,826,459

DEVICE FOR CONTROLLING THE FLOW OF GRANULAR MATERIALS

Filed Dec. 15, 1953

INVENTOR.

BY

ATTORNEYS

March 11, 1958 H. OETIKER 2,826,459
DEVICE FOR CONTROLLING THE FLOW OF GRANULAR MATERIALS
Filed Dec. 15, 1953 2 Sheets-Sheet 2

*INVENTOR*
HANS OETIKER

BY
*ATTORNEY*

United States Patent Office 2,826,459
Patented Mar. 11, 1958

2,826,459

DEVICE FOR CONTROLLING THE FLOW OF GRANULAR MATERIALS

Hans Oetiker, St. Gallen, Switzerland, assignor to Gebrueder Buehler, Uzwil, Switzerland, a firm Application December 15, 1953, Serial No. 398,386

Claims priority, application Switzerland December 16, 1952

5 Claims. (Cl. 302—35)

The invention relates to a method and a device for controlling the flow of granular materials, such as, for instance, grain and meal, in pneumatically or vacuum operated conveyor installations.

The method is characterized therein that the feed of the granular materials into a transport conduit is controlled by pressure changes produced in the same. The variable pressure difference at and between two places of the feed conduit may, for instance, be used for the purposes of this control. However, also the variable pressure difference between a portion in the transport conduit, for instance, the inlet of the materials and the atmospheric pressure may be used for the purposes of the invention. It is advisable to control the air speed in the transport conduit to a constant value, since in such case the pressure and accordingly any pressure difference in the transport conduit will be proportional to the transported quantity per time unit.

For the performance of this method a device is used containing at the feeding place a shut-off organ which reacts upon pressure changes and may be constructed as a flap. The control of this shut-off or closure organ may be performed directly or indirectly by the changeable pressure difference in the feed line or conduit.

For the purpose of the direct control at least one branch line of the transport conduit may be conducted to a pressure-sensitive organ which controls a closure organ at the feed entry of the conducted materials.

If the pressure control is effected by the pressure difference between two points of the conveyor line or conduit two branch lines or conduits may be conducted from the main transport line to a pressure sensitive control organ. This organ contains at least one pressure sensitive membrane or a control piston which is displaceable by pressure changes. In addition to the membrane, which directly reacts to pressure changes, a second membrane may be provided, which has a center valve and is provided with sealing means to retard its opening movement.

The invention will now be dscribed more in detail and with reference to the accompanying drawing.

Figure 1:
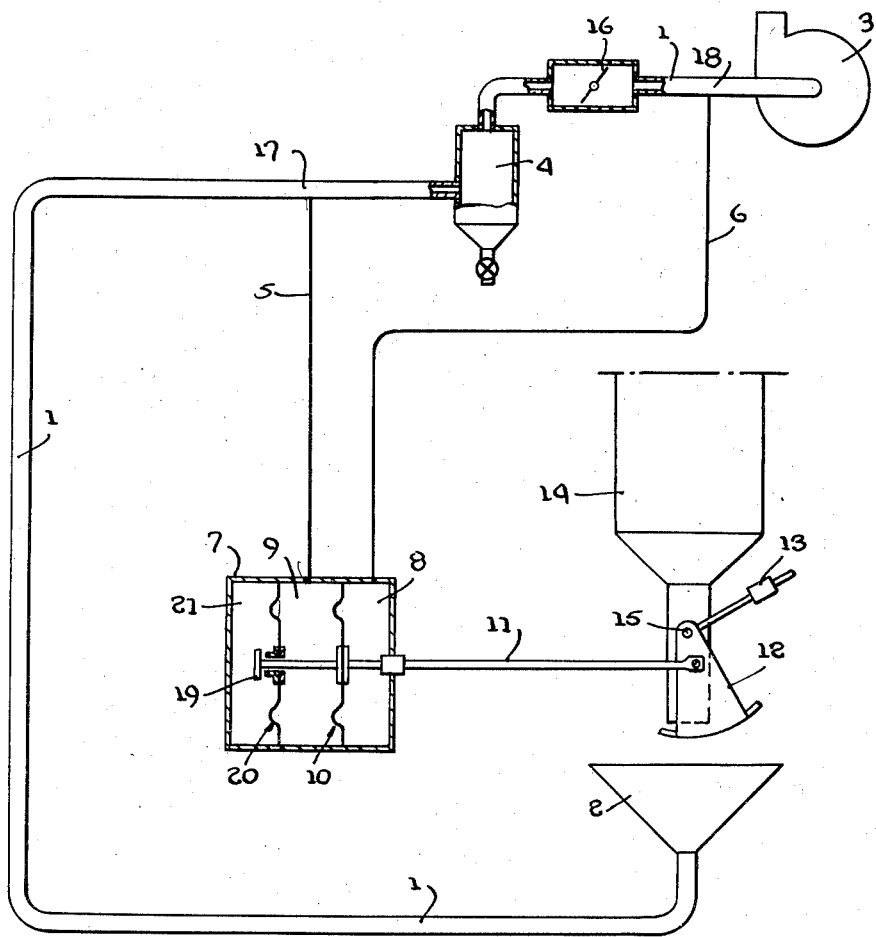
Fig. 1 is a vertical sectional view of a transporting device for granular materials constructed in conformity with this invention and being provided with indirectly operative control means.

In conformity with Figure 1 the granular materials to be transported are fed into a funnel 2. The subpressure or vacuum is created by a blower 3; the materials transported through conduit 1 are separated from the air flow in the separator 4. At two points of conduit 1 denoted by the numerals 17 and 18 conduits 5, 6 are branched-off having a diameter of about 6 to 8 millimeters.

These conduits lead to the chambers 8, 9 of a control device 7, these chambers 8, 9 being located at the two opposite sides of membrane 10. This membrane is by means of rod 11 connected with a closure flap 12 which is rotatable about pin 15 and loaded by an adjustable weight 13.

Closure flap 12 controls the material flow from the container 14 into the funnel 2 of the conduit 1. An automatically operative control flap 16 is provided in conduit 1 whereby the air flow per time unit is maintained at a possibly constant ratio.

A pressure differential $\Delta p$ prevails in the portions of conduit 1 denoted by numerals 17 and 18, this pressure differential being an indicator for the resistance momentarily prevailing in conduit 1. The differential pressure $\Delta p$ is transmitted to the chambers 8 and 9 of the flow control device. The pressure at point 18 equals the sucking pressure of the blower 3 and remains practically the same. If at a certain moment of the operation too much material flows into the transporting conduit 1 the pressure difference $\Delta p$ becomes smaller since the regulating throttle 16 secures the constancy of the air flow through the conduit 1 per time unit or the air flow speed and is opened accordingly; the membrane 10 is slightly displaced to the left and closes flap 12. Moreover, the valve cover 19 is separated from its seat and a quick pressure exchange takes place between the chambers 9 and 21 separated by the perforated membrane 20. The supply of material is therefore quickly braked.

If, on the other hand, at a certain moment a relatively small amount of material is fed into the inlet 2, the differential pressure $\Delta p$ is increased, since the control flap is somewhat closed. The membrane 8 is displaced towards the right and the closure flap 12 is opened.

Since at the same time the valve cover 19 is closed and the membrane 20 is moved to the right a retardation of the opening movement of flap 12 occurs, since a vacuum is formed in chamber 21. The valve 19 has a small compensating opening and the braking effect is only temporary. This retarding action during the opening of the flap is, however, greatly welcome and prevents at the same time the entry of an overload of material. When the pressure difference between the chambers 9 and 8 increases, membrane 10 is pushed to the right and valve 19 closes and draws membrane 20 to the right. A vacuum results in chamber 21 which brakes the opening movement of the feed device. As the valve 19 is closed it is necessary to have a compensating orifice to equalize the pressure in chambers 9 and 21.

The weight is adjusted in such a manner that at a median differential pressure of, for instance, $\Delta p=100$ millimeter water column a normal material feed takes place. If the $\Delta p$ value is changed the flap 12 is closed or opened more or less in the above described manner. If the operation of the blower 3 for some reason, for instance, by a stoppage of the supply of current should be interrupted the $\Delta p$ becomes equal to 0 and the flap 12 is entirely closed.

The described device is particularly suitable to effect the constant discharge flow of materials from a reservoir and to bring about the control of the supply in the transport conduit used in flow-through processes or in a fill-up drain; it may also be advantageously used for the discharge of materials from a pass-through bunker having a constant depot height; in this case a pneumatic reversing slide which is controlled by the depot height could be installed in the conduit 6.

If the pressure difference between a part of the conduit 1 and the atmospheric pressure is utilized a branch conduit may, for instance, lead from the conduit to a chamber of the control device; the other chamber may then be directly connected with the atmosphere.

The pressure release places should be generally chosen in such a manner that the pressure difference is as large as possible. It is, of course, always possible to increase by pneumatic or hydraulic devices the pressure differences and the pressure changes.

Figure 2:
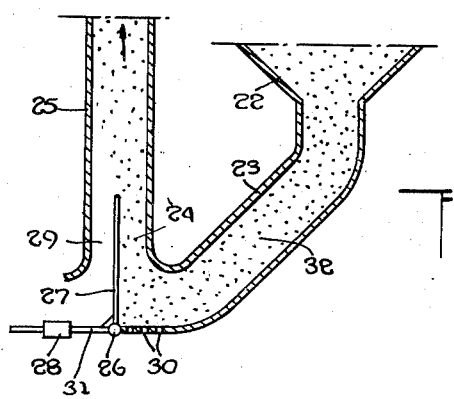
Fig. 2 is a vertical sectional view of the material inlet and of the shut-off organ if direct control means are provided.

The device shown in Figure 2 is with respect to its substantial parts equal to the one of Figure 1.

The difference consists therein that the shut-off device is directly controlled by the variable pressure difference. The materials to be transported flow from the conical end 22 through a downwardly leading pipe 23 to the inlet 24 and the pneumatically operated conduit 25. A flap 27 rotatable about an axis 26 is provided in the inlet; the flap 27 is loaded by a adjustable weight 28 which is supported by a lever 31. Flap 27 regulates the feed of the material 32 through the opening 24 and of the air through the opening 29.

Figure 3:
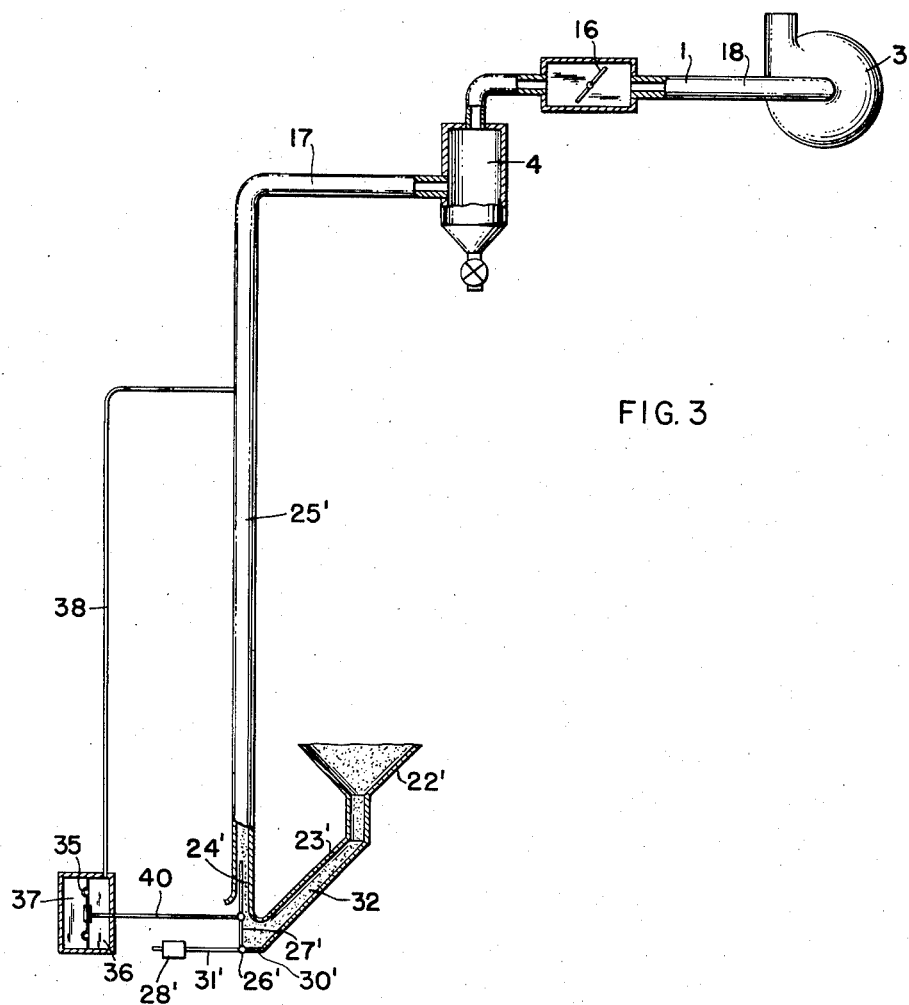
Fig. 3 is a vertical sectional view of the direct control means of Fig. 2 which is used in a transporting device similar to that of Fig. 1.

Rod 40 in Fig. 3 has a function similar to that of rod 11 in Fig. 1 and rod 40 is connected at one end to flap 27' and at the other end to membrane 35, the latter being similar in structure and function to membrane 20 in Fig. 1. Corresponding in structure and function to conical end 22 Fig. 2, is end 22' in Fig. 3; pipe 23 in Fig. 2 is pipe 23' in Fig. 3; inlet 24 in Fig. 2 is inlet 24' in Fig. 3; conduit portion 25 in Fig. 2 is conduit portion 25' in Fig. 3; flap pivot 26 in Fig. 2 is flap pivot 26' in Fig. 3; weight 28 and lever 31 in Fig. 2 are weight 28' and lever 31' in Fig. 3; openings 30 shown in Fig. 2 correspond to openings 30' in Fig. 3 and the same material 32 is present in both embodiments of Figs. 2 and 3.

The control device 34 in Fig. 3 embodies chambers 36 and 37 on opposite sides of membrane 35 (similar to membrane 10 in Fig. 2). Membrane 35 is connected to rod 40 at the end thereof remote from the connection to flap 27'.

The operation of the control device is as explained in connection with control device 7 in Fig. 1 below and for convenience other corresponding parts in Figs. 1 and 3 are listed:

Chamber 9 in Fig. 1 is chamber 36 in Fig. 3
Chamber 21 in Fig. 1 is chamber 37 in Fig. 3
Branch conduit 5 to chamber 9 in Fig. 1 is branch conduit 38 in Fig. 3.

To the right of the main conduit section 17 in Fig. 1 the remaining parts 3, 4, 16 and 18 are identical and correspondingly numbered in Fig. 3.

That portion of the main conduit connected to the shut off organ of Fig. 3 and designated 25' therein corresponds to the vertical portion of the main conduit shown in Fig. 1.

This device is operated as follows.

If the blower is stopped the flap 26 is pressed towards the left side by the weight 28 whereby entry of air is prevented. If the materials 32 enter through tube 23 the space in the tube will be filled-up to the opening 24. Upon starting the blower 3 attached to tube 1 (see Figure 1) an increasing vacuum is produced which presses the flap 29 to the right, whereby air may enter and upwardly suck the materials in the direction of arrow x. The weight 28 may now be displaced in such a manner that the desired quantity of the materials to be transported is adjusted; the maximum quantity depends, of course, upon the dimension of the conduit 1 and the capacity of the blower.

If the quantity of the entering material is variable also the air pressure at the inlet of the material will change; the flaps are automatically adjusted in such a manner that a constant flow of material is sucked-in. These conditions are particularly favorable if, as shown in Figure 1, an automatically operable flap for the maintenance of a constant quantity of air per time unit is built into the transporting conduit.

It was found that it is essential to apply slots 30 at the lowest part of the conduit through which additional air may be entered to loosen the material supply.

The material inlet feed may be built into a machine, for instance, the roller-frame of a mill; in this case the shut-off organ may be the feed flap of the roller frame and it is possible to control this feed flap directly by the entering materials and by the pressure changes in the conduit leading from the roller frame, whereby obstructions and blockages are eliminated.

If a plurality of transporting lines are provided each line may be provided with the device shown in Figure 1. The conduits 6 may be connected and led to a common blower.

Since certain changes in carrying out the above invention could be made without departing from the scope thereof, it is intended that all matter contained in the above description or shown in the accompanying drawing shall be interpreted as illustrative and not in a limiting sense.

It is accordingly desired that in construing the breadth of the appended claims they shall not be limited to the specific exemplifications of the invention described herein.

I claim:

1. A device for pneumatically operating conveyor installations for the transport of finely divided materials, such as grain and meal, comprising a conveyor conduit, a suction blower located at the discharge end of said conduit, a mobile flap dividing the inlet end of said conveyor conduit into a first section for supplying the materials and a second section for introducing the conveying air and an external force for compensating the difference of the pressure acting on two sides of said flap.

2. In the device according to claim 1, said external force acting in the form of a weighted lever.

3. In the device according to claim 1, an automatically operative control flap in said conveyor conduit to secure the constancy of the air supply per time unit to said conveyor conduit.

4. A device as claimed in claim 1 including a pressure sensitive device, a branch conduit connected at one end to said conveyor conduit and at the other end to said pressure sensitive device, said pressure sensitive device having an element which is displaced to one side by the pressure in said conveyor conduit and which is displaced to the other side by said external force.

5. A device as claimed in claim 4 wherein said element is a rod and a membrane which is connected to said flap by said rod.

References Cited in the file of this patent
UNITED STATES PATENTS

| | | |
|---|---|---|
| 1,450,903 | Newhouse | Apr. 3, 1923 |
| 2,404,937 | Anderson | July 30, 1946 |
| 2,421,861 | Zeeh | June 10, 1947 |
| 2,544,011 | Duval | Mar. 6, 1951 |

FOREIGN PATENTS

| | | |
|---|---|---|
| 592,793 | Germany | Feb. 15, 1934 |